United States Patent [19]
Wilson et al.

[11] Patent Number: 5,172,598
[45] Date of Patent: Dec. 22, 1992

[54] STORED GAS INFLATABLE RESTRAINT INFLATION SYSTEM

[75] Inventors: Keith D. Wilson, Highland; Gregory A. Miller, Troy; Brian H. Frantz, Royal Oak; Jeffery L. Pearson, Rochester, all of Mich.

[73] Assignee: General Motors Corporation, Detroit, Mich.

[21] Appl. No.: 662,056

[22] Filed: Feb. 28, 1991

[51] Int. Cl.⁵ .................................. G01N 17/00
[52] U.S. Cl. ........................................ 73/865.6
[58] Field of Search ............ 73/865.6, 865.9, 37, 73/23.31, 23.32, 864.62, 864.73; 280/741; 137/223, 602, 896, 897, 605, 606

[56] References Cited

U.S. PATENT DOCUMENTS

| | | | |
|---|---|---|---|
| 3,417,779 | 12/1968 | Golay | 137/896 |
| 3,991,249 | 11/1976 | Yamashita et al. | 428/35.5 |
| 4,332,368 | 6/1982 | Woloszczuk | 251/30 |
| 4,498,496 | 2/1985 | Barcellona et al. | 137/606 |
| 4,981,534 | 1/1991 | Scheffe | 280/741 |
| 5,074,155 | 12/1991 | Vecere | 73/864.62 |

FOREIGN PATENT DOCUMENTS 0568863 8/1977 U.S.S.R. ............ 73/864.62

Primary Examiner—Robert Raevis
Attorney, Agent, or Firm—Raymond I. Bruttomesso, Jr.

[57] ABSTRACT

A testing apparatus connects to an inflatable restraint and simulates the inflation curve of a pyrotechnic device used in a vehicle. A manifold connects the inflatable restraint to a pair of parallel accumulators for communicating a gas to the inflatable restraint. The accumulators store gas at a high pressure. A valve is connected and interposed between each of the accumulators and the manifold for releasing the flow of the gas out of the accumulators. An adjustable orifice is connected and interposed between each of the valves and the manifold for regulating the flow of the gas out of the accumulators. A flow shut off device is connected to the manifold and is interposed between the accumulators and the inflatable restraint and is adapted for stopping the flow of gas from the first and second accumulator to the inflatable restraint. A valve timing sequencer is connected to the valves and the flow shut off device for timing the actuation of the valves and the flow shut off device whereby the valves and the flow shut off device are actuate in sequence to release the gas from the accumulators and then stop the flow of the gas to the inflatable restraint to simulate the inflation curve of the pyrotechnic device.

4 Claims, 2 Drawing Sheets

STORED GAS INFLATABLE RESTRAINT INFLATION SYSTEM

This invention relates to an apparatus and method to inflate an inflatable restraint with a stored gas and more particularly to inflate the inflatable restraint from the stored gas such that the inflation of the inflatable restraint simulates that of the inflating by hot gases from a pyrotechnic gas generator.

BACKGROUND OF THE INVENTION

It is known to mount an inflatable restraint on the hub of the steering wheel or on the instrument panel in the passenger compartment to supplement the seat belts in the event of a frontal crash. The inflatable restraint is inflated by a hot nitrogen gas generated by the ignition of a pyrotechnic device. The inflatable restraint is designed for a specific car by varying the size of the inflatable restraint, the rate and pressure of inflation, and the size of the vents in the bag which control deflation of the inflatable restraint.

Because of the large number of variables involved in the design and engineering of an effective inflatable restraints system, it would be desirable to provide an inflation apparatus and method which could be re-used repeatedly and also be readily adjusted to vary the rate and pressure of inflation of the inflatable restraints. It has been found that the use of pyrotechnic devices may not be desirable during this development and engineering effort because such devices are not reusable and considerable time and expense is required to manufacture the pyrotechnic devices which must be employed to provide inflation gases at varying rates and pressures.

Therefore it would be desirable to provide an apparatus and method by which readily available compressed gases could be employed to simulate the inflation rates and pressures ordinarily obtained from the hot gas generated by the pyrotechnic devices.

SUMMARY OF THE INVENTION

This invention provides a testing apparatus which connects to an inflatable restraint and simulates the inflation curve of a pyrotechnic device used in a vehicle. The testing apparatus has a manifold connected to the inflatable restraint for communicating gas to the inflatable restraint. First and second accumulators for storage of the gas at a high pressure are connected to the manifold. A first valve is interposed between the first accumulator and the manifold for the flow of the gas out of the first accumulator. A first adjustable orifice is interposed between the first valve and the manifold for regulating the flow of the gas out of the first accumulator. A second valve is interposed between the second accumulator and the manifold for releasing the flow of the gas out of the second accumulator. A second adjustable orifice is interposed between the second valve and the manifold for regulating the flow of the gas out of the second accumulator. A flow shut off device is connected to the manifold, and interposed between the first and second accumulators and the inflatable restraint and adapted for stopping the flow of gas from the first and second accumulators to the inflatable restraint. A valve timing sequencer is connected to the first valve, second valve and the flow shut off device for timing the actuation of the valves and the flow shut off device whereby the first valve, the second valve and the flow shut off device are actuated in timed sequence to release the gas from the accumulators and then stop the gas flow from the accumulators to the inflatable restraint thereby simulating the inflation curve of the pyrotechnic device.

One object, feature and advantage resides in the provision of an apparatus having a plurality of valves to release a gas from a plurality of accumulators in set sequence by a valve timing sequencer to simulate the inflation curve of the pyrotechnic device.

Another object, feature and advantage resides in the provision of the apparatus having a pair of adjustable orifices to regulate the flow of the gas from the accumulators to simulate the inflation curve of the pyrotechnic device.

Another object, feature and advantage resides in the provision of the apparatus using a mixture of nitrogen and helium to simulate the hot gases from the pyrotechnic device.

Further objects, features and advantages of the present invention will become more apparent to those skilled in the art as the nature of the invention is better understood from the accompanying drawings and detailed description.

DESCRIPTION OF THE PREFERRED EMBODIMENT

Figure 1:
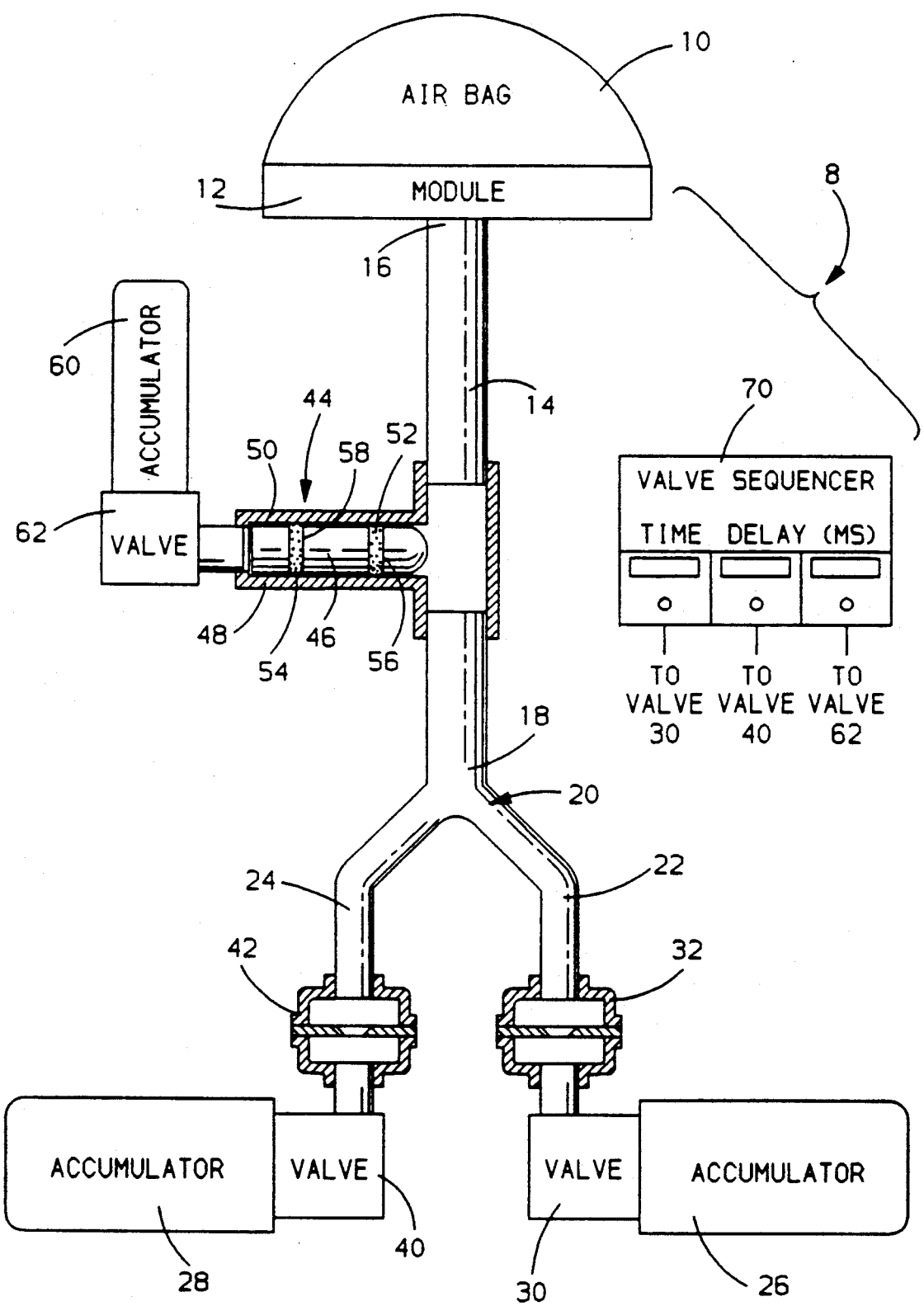
FIG. 1 is a schematic of a stored gas inflatable restraint inflation system with the shut off valve shown in detail.

Referring to FIG. 1, a test apparatus 8 has an airbag or an inflatable restraint 10 mounted to a module 12 located on a test stand, such as an impact sled, not shown, for testing of the inflatable restraint 10 during development.

The inflatable restraint 10 is connected to a first end 16 of a manifold 14 for communicating a gas to the inflatable restraint 10. At a second end 18 of the manifold 14 is a "Y" block 20 defining a first opening 22 and a second opening 24. The "Y" block 20 allows the flow of gas entering from the two openings 22 and 24 to converge and flow smoothly.

A first high pressure accumulator 26, for storage of a first gas at a high pressure, is connected to the first opening 22 on the "Y" block 20. The first high pressure accumulator 26 has a capacity of 200 cubic inches and is rated at 3000 psi.

A second high pressure accumulator 28, for storage of a second gas at a high pressure, is connected to the second opening 24 of the "Y" block 20 of the manifold 14 and is in parallel with the first high pressure accumulator 26. The second high pressure accumulator 28 is similar in construction to the first high pressure accumulator 26.

A first fast-acting, high flow valve 30 is connected and interposed between the first high pressure accumulator 26 and the "Y" block 20 for releasing the flow of the first gas out of the first high pressure accumulator 26. The valve is required to open quickly and not restrict the flow out of the accumulator.

The first high flow valve 30 is a valve manufactured by Crown Systems of Madison Heights, Mich. for use in dumping high pressure stored gas for the fire extinguishing system of the M-1 tank. U.S. Pat. No. 4,332,368 discloses such a fast-acting high flow valve.

The valve 30 was modified to achieve a 2,000 psi maximum working pressure and certified burst pressure of 12,000 psi. The valve 30 takes 4 milliseconds to open fully.

A first adjustable inlet orifice junction 32 is connected and interposed between the first fast-acting high flow valve 30 and the "Y" block 20 for regulating the flow of the first gas out of the first high pressure accumulator 26. The adjustable inlet orifice is achieved by insertion of a metal plate into the manifold. The metal plate has a hole with a sharp edge with a diameter up to 1.5 inches. The manifold 14 has a inside diameter of 1.5 inches.

The first high flow valve 30 in combination with the first adjustable inlet orifice junction 32 defines a flow control means that both releases and regulates the flow of gas out of the accumulator 26.

A second fast-acting, high flow valve 40 is similar to the first high flow valve 30 and is connected and interposed between the second high pressure accumulator 28 and the "Y" block 20 for releasing the flow of the second gas out of the second high pressure accumulator 28.

The second accumulator 28 has a second adjustable inlet orifice junction 42, similar to the first adjustable inlet orifice junction 32, connecting and interposed between the second fast-acting high flow valve 40 and the "Y" block 20 for regulating the flow of the second gas out of the second high pressure accumulator 28.

A flow shut off device 44 is connected to the manifold 14 and interposed between the inflatable restraint 10 and the first and second high pressure accumulator 26 and 28 for stopping the flow of gases from the first and second high pressure accumulator 26 and 28. The flow shut off device 44 has a slidable bullet 46 located in a passage 48 which opens perpendicularly onto the manifold 14. The bullet 46 is slidably movable between a retracted position as shown in FIG. 1 which does not interfere with flow in the manifold 14 and a closed position which stops the flow of gases in the manifold 14 from the first and second high pressure accumulator 26 and 28 to the inflatable restraint 10. The slidable bullet 46 is held in position by an interference fit of a pair of rubber "O" rings 52 and 54 with a side wall 50 of the passage 48. The "O" rings 52 and 54 are mounted in a pair of grooves 56 and 58 in the bullet 46.

A third high pressure accumulator 60 is connected to the flow shut off device 44. The third pressure accumulator 60 is for storage of a third gas at a high pressure and has a capacity of 30 cubic inches and is rated to 1800 psi. A third fast-acting, high flow valve 62 of similar design as the first and second high flow valves 30 and 40 is connected and interposed between the third high pressure accumulator 60 and the flow shut off device 44 and is for releasing the flow of the third gas out of the third high pressure accumulator 60. The gas from the third accumulator 60 moves the bullet 46 from the retracted position to the closed position shutting off the flow of the gases from the first and second accumulators 26 and 28.

A valve timing sequencer 70 is connected to the fast-acting, high flow valves 30, 40 and 62 and sends a electrical signal of 36 volts to the valves 30, 40 and 62 at the proper time to actuate the valves 30, 40 and 62. The valve timing sequencer 70 is adjusted to provide the desired response. Initiation of the system can be provided by either by an acceleration triggered input on the impact sled or by a manual trigger input. For example, the first valve 30 is triggered at 9 milliseconds, the second valve 40 at 34 milliseconds and the third valve 62 at 70 milliseconds. There is a time lag between when a valve is opened and when the high pressure gas reaches the inflatable restraint 10, which must be accounted for in determining when the valves 30, 40 and 62 will be triggered.

Figure 2:
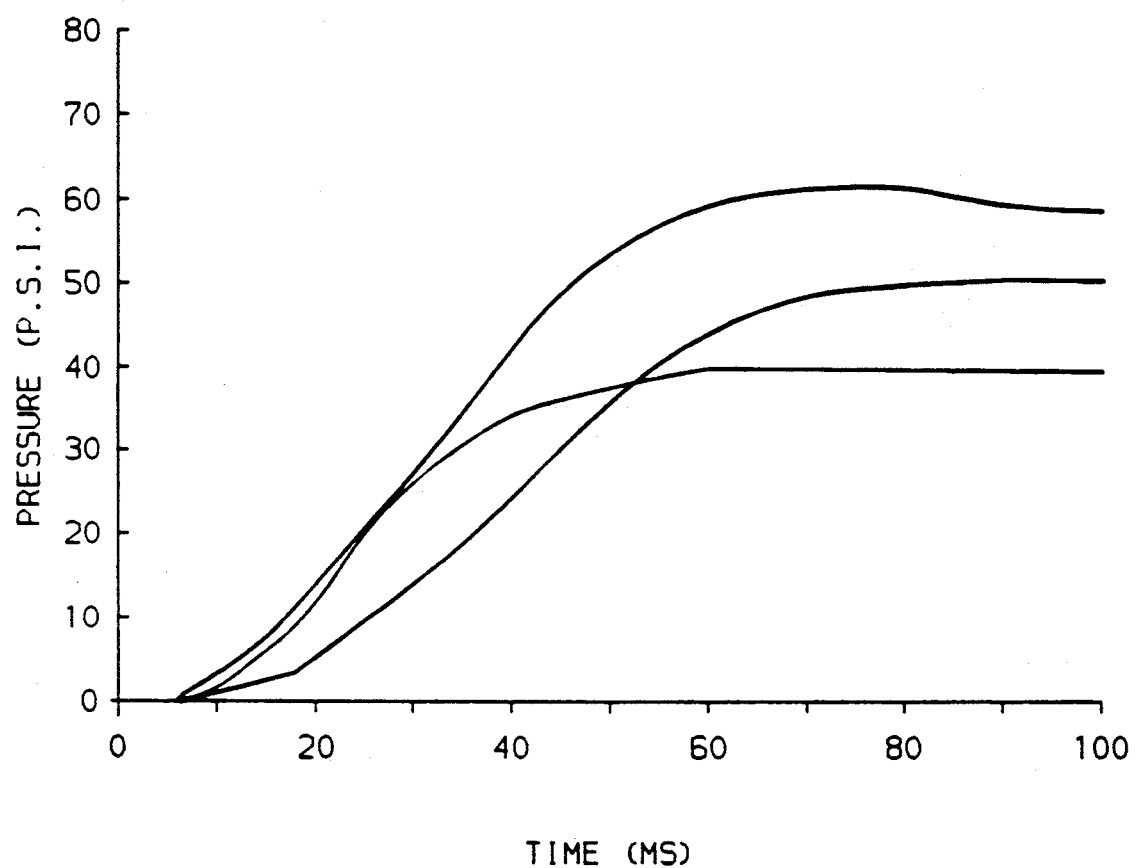
FIG. 2 is a set of representative curves of pressure versus time of the gas entering the inflatable restraint.

FIG. 2 shows three examples of curves of pressure versus time for the gas entering the inflatable restraint 10. By varying the charge pressures, orifice diameters and valve sequencing, the inflation rate of the inflatable restraint 10 can be varied. The more pressure in the accumulators will increase the duration the accumulator influences the curve and indirectly the flow. The orifice diameters will affect the flow and thereby the slope of the curve. The changing of valve sequencing will shift the curve and also effect how the second accumulator 28 will add to the pressure/time curve created by the first accumulator 26. In addition the size of the vents, not shown, in the inflatable restraint effect the deflation rate of the bag and therefore the inflation rate.

The stored gas in the first accumulator 26 is released through the first fast-acting high flow valve 30 after a pre-set time after the system actuation. The gas passes through the first adjustable inlet orifice 32, the "Y" block 20 and manifold 14 then into the inflatable restraint 10.

After another pre-set time has elapsed, the second fast-acting high flow valve 40 is actuated to release the stored gas from the second accumulator 28. This gas passes through the second adjustable inlet orifice 42 and the "Y" block 20 connector to the the inflatable restraint 10.

After a final pre-set time has elapsed, the third fast high flow valve 62 is actuated to release the stored gas in the third accumulator 60. This gas forces the bullet 46 of the flow shutoff device 44 to move from the retracted position to the closed position thereby closing the flow in the manifold 14 stopping the inflation process and allowing the inflation restraint 10 to eventually deflate through the vents.

To run another test, the inflatable restraint 10 is repacked in an undeployed position. The valves 30, 40 and 62 are closed. The bullet 46 of the flow shutoff device 44 is moved back to the retracted position. The three high pressure accumulators 26, 28 and 60 are charged with high pressure stored gas from a remote inflating station, not shown.

Because there is a temperature differences between the hot pyrotechnic generated gas and the cold high pressure bottled which are used to inflate the inflatable restraint 10, a difference in the mass flow rate out of the inflatable restraint 10 through vents, not shown, results. This difference in mass flow rate causes a differences in the internal pressure of the inflatable restraint 10 and thus the amount and rate of restraint. To compensate for these differences, helium is mixed with nitrogen to provide a gas density which approximates the density of hot nitrogen gas which is generated by the pyrotechnic device. The ratio by volume of nitrogen to helium is approximately $\frac{1}{4}$ to $\frac{3}{4}$. The ratio is a function of the amount of venting of the inflatable restraint 10 and the internal temperatures developed. Furthermore, the ratio of nitrogen to helium does not need to be identical in the three accumulators 26, 28 and 60. However, the same gas mixture is usually used to fill each of the accumulators 26, 28 and 60.

While an embodiment of the present invention has been explained, various modifications within the spirit and scope of the following claims will be readily apparent to those skilled in the art.

The embodiments of the invention in which an exclusive property or privilege is claimed are defined as follows:

1. A testing apparatus for inflating an inflatable restraint and simulating the inflation curve of a pyrotechnic device used in a vehicle, the testing apparatus comprising:
   a manifold connected to the inflatable restraint for communicating of a gas to the inflatable restraint;
   a first accumulator for storage of the gas at a high pressure connected to the manifold;
   a second accumulator for storage of the gas at a high pressure connected to the manifold;
   a first valve connecting and interposed between the first accumulator and the manifold for releasing the flow of the gas out of the first accumulator;
   first flow control means connecting and interposed between the first valve and the manifold for regulating the rate of flow of the gas out of the first accumulator;
   a second valve connecting and interposed between the second accumulator and the manifold for releasing the flow of the gas out of the second accumulator;
   second flow control means connecting and interposed between the second valve and the manifold for regulating the rate of flow of the gas out of the second accumulator;
   flow shut off means connected to the manifold and interposed between the first and second accumulator and the inflatable restraint and adapted for stopping the flow of gas from the first and second accumulator to the inflatable restraint; and
   valve timing means connected to the first valve, second valve and the flow shut off means for timing the actuation of the valves and the flow shut off means whereby the first valve, the second valve and the flow shut off means are actuated in sequence to release the gas from the accumulators and then stop the flow of the gas to the inflatable restraint to simulate the inflation curve of the pyrotechnic device.

2. The testing apparatus of claim 1 wherein the gas is a mixture of nitrogen and helium whereby the gas simulates that of the gas from the pyrotechnic device.

3. A testing apparatus for inflating an inflatable restraint which simulates the inflation curve of a pyrotechnic device used in a vehicle, the testing apertures comprising:
   a manifold connected at one end to the inflatable restraint and the other end having a "Y" block defining a pair of openings;
   a first high pressure accumulator, for storage of a first gas at a high pressure, connected to one of the openings on the "Y" block;
   a second high pressure accumulator, for storage of a second gas at a high pressure, connected to the manifold at the other opening on the "Y" block;
   a first fast-acting, high flow valve connecting and interposed between the first high pressure accumulator and the "Y" block for releasing the flow of the first gas out of the first high pressure accumulator;
   a first adjustable inlet orifice junction for connecting and interposed between the first fast-acting high flow valve and the "Y" block for regulating the flow of the first gas out of the first high pressure accumulator;
   a second fast-acting, high flow valve connecting and interposed between the second high pressure accumulator and the "Y" block for releasing the flow of the second gas out of the second high pressure accumulator;
   a second adjustable inlet orifice junction for connecting and interposed between the second fast-acting high flow valve and the "Y" block for regulating the flow of the second gas out of the second high pressure accumulator;
   a flow shut off means connected to the manifold and interposed between the inflatable restraint and the first and second high pressure accumulator and having a slidable bullet for slidable movement to a position stopping the flow of gases from the first and second high pressure accumulators;
   a third high pressure accumulator connected to the flow shut off means for storage of a third gas at a high pressure;
   a third fast-acting, high flow valve connecting and interposed between the third high pressure accumulator and the flow shut off means for releasing the flow of the third gas out of the third high pressure accumulator allowing the third gas to move the bullet of the flow shut off means stopping the flow of the gases from the first and second high pressure accumulator; and
   a valve timing means connected to the fast-acting, high flow valves for timing the actuation of the valves whereby the valves are actuate in sequence to release the gas from the pressure accumulator to simulate the inflation curve of the pyrotechnic.

4. A test apparatus of claim 3 wherein the first gas, the second gas and the third gas are mixtures of nitrogen and helium whereby the gas simulates that of the gas from the pyrotechnics.

* * * * *